United States Patent
Comfort et al.

(10) Patent No.: US 6,810,768 B2
(45) Date of Patent: Nov. 2, 2004

(54) COMPLIANT LINK

(75) Inventors: John Vivian Comfort, Warwickshire (GB); Robert Fischer, Bühl/Baden (DE); Bernhard Boll, Wellesbourne (GB); Peter Giese, Herzogenaurach (DE)

(73) Assignee: LuK Lamellen und Kupplungsbau Beteiligungs KG, Buhl (DE)

( * ) Notice: Subject to any disclaimer, the term of this patent is extended or adjusted under 35 U.S.C. 154(b) by 0 days.

(21) Appl. No.: 09/996,256

(22) Filed: Nov. 28, 2001

(65) Prior Publication Data

US 2002/0078787 A1 Jun. 27, 2002

(30) Foreign Application Priority Data

Dec. 27, 2000 (GB) .............................................. 0031624

(51) Int. Cl.[7] .................................................. G05G 7/16
(52) U.S. Cl. ....................................................... 74/582
(58) Field of Search ...................... 74/582, 581, 579 R, 74/473.11, 473.1, 473.36, 473.29, 470, 473.3; 403/229, 220, 286, 291; 267/69, 70, 71, 72, 73, 178, 249, 241

(56) References Cited

U.S. PATENT DOCUMENTS

| | | | | |
|---|---|---|---|---|
| 1,323,046 A | * | 11/1919 | Gildner | 464/99 |
| 1,435,307 A | * | 11/1922 | Jones | 267/72 |
| 1,816,401 A | * | 7/1931 | Rolland | 267/207 |
| 1,817,255 A | * | 8/1931 | Hawley | 74/582 |
| 2,762,055 A | * | 9/1956 | Bermueller | 450/51 |
| 2,821,091 A | * | 1/1958 | Benner | 74/482 |
| 2,836,986 A | * | 6/1958 | Kretz | 74/470 |
| 3,136,844 A | * | 6/1964 | Petersen | 174/90 |
| 4,217,790 A | * | 8/1980 | Lindblom | 74/470 |
| 4,519,294 A | * | 5/1985 | Hemens | 91/374 |
| 4,777,839 A | * | 10/1988 | Lindholm et al. | 74/473.29 |
| 5,692,992 A | * | 12/1997 | Arvidsson et al. | 477/101 |
| 5,850,760 A | * | 12/1998 | Jin et al. | 74/473.11 |
| 6,450,057 B1 | * | 9/2002 | Winkler et al. | 74/473.37 |

FOREIGN PATENT DOCUMENTS

| | | |
|---|---|---|
| DE | 195 04 847 A1 | 2/1995 |
| DE | 197 34 023 A1 | 8/1997 |
| EP | 0043 660 | 4/1986 |
| EP | 0038 113 | 7/1986 |
| EP | 059 035 | 1/1987 |
| EP | 0101 220 | 1/1987 |
| WO | WO 92/13208 | 8/1992 |
| WO | WO 97/05410 | 2/1997 |
| WO | WO 97/10456 | 3/1997 |
| WO | WO 97/40300 | 10/1997 |

* cited by examiner

*Primary Examiner*—Chong H. Kim
(74) *Attorney, Agent, or Firm*—Darby & Darby

(57) ABSTRACT

A compliant link has a first member adapted to be connected to a linear actuator and a second member adapted to be connected to a component to be moved by the linear actuator, said members being interconnected by a connecting rod which is moveable relative to both the first and second members, springs acting between the first and second members and the connecting rod to oppose relative movement between the connecting rod and the first and second members when an axial load below a first predetermined value is applied to one of the members.

7 Claims, 4 Drawing Sheets

COMPLIANT LINK

The present invention relates to a compliant link and in particular a compliant link for a gear engagement mechanism and more particularly, a gear engagement mechanism for a multi-ratio gearbox used in an automated transmission system.

In automated transmission systems, for example automated manual transmission systems or for automatic or semi-automatic transmissions including a multi-ratio gearbox of, for example, the type disclosed in WO97/05410 or WO97/40300, whose content is expressly incorporated in the disclosure content of the present application, a gear engagement mechanism comprises a plurality of shift rails, each shift rail being associated with two gear ratios of the gearbox, via a selector fork and synchromesh unit, so that axial movement of each shift rail in either direction will engage one of the associated gear ratios.

A selector member is moved by a select actuator in a select direction transverse to the shift rails, to be indexed with and engage a selected one of the shift rails and, by a shift actuator, in a shift direction, axially of the shift rails, to move the selected shift rail axially in one direction or the other, to engage the selected gear ratio.

Alternatively, as disclosed in for example UK patent application GB0028310.1, whose content is expressly incorporated in the disclosure content of the present application, each shift rail may be provided with a separate shift actuator, the shift actuator being connected directly to the shift rail for movement of the shift rail axially in either direction.

In accordance with WO97/05410, WO97/40300 and GB0028310.1, the select and shift actuators are hydraulic actuators. DE19734023, whose content is expressly incorporated in the disclosure content of the present application, discloses the use of electric motors to move the selector member in the first and second directions respectively.

With hydraulic actuation systems, it is desirable to have low compliance in the hydraulic system and, due to the high dynamic potential of such systems, it is necessary to decelerate the hydraulic shift actuator considerably, before hitting the synchroniser. Without a cautious control of the shift actuator, a high pressure peak can be generated at the start of synchronisation, which can lead to hardware damage and reduces the driving comfort, causing noise and jerks in the drive line.

The present invention provides a compliant link which may be located between the shift actuator and the shift rail, which will limit the initial load which will be applied to the synchroniser, thereby avoiding damage thereto and reducing noise and jerks in the drive line.

According to one aspect of the present invention, a compliant link comprises first and second members, said members being interconnected by resilient means, the resilient means being preloaded to prevent relative movement between the members when an axial load below a first predetermined value is applied to one of the members.

According to a preferred embodiment of the invention, the link is a double acting link providing for compliance for axial movement of the link in either direction.

According to a further preferred embodiment, relative movement between the members is limited, so that relative movement will not occur between the members when an axial load above a second predetermined value is applied to one of the members.

A compliant link described above may be located between the shift actuator and a shift rail of the transmission system, whereby the initial loads applied to a synchromesh unit associated with the shift rail may be moderated, thereby avoiding damage to the synchromesh unit and noise and jerks etc. in the drive line.

An embodiment of the invention is now described, by way of example only, with reference to the accompanying drawings, in which.

Figure 1:
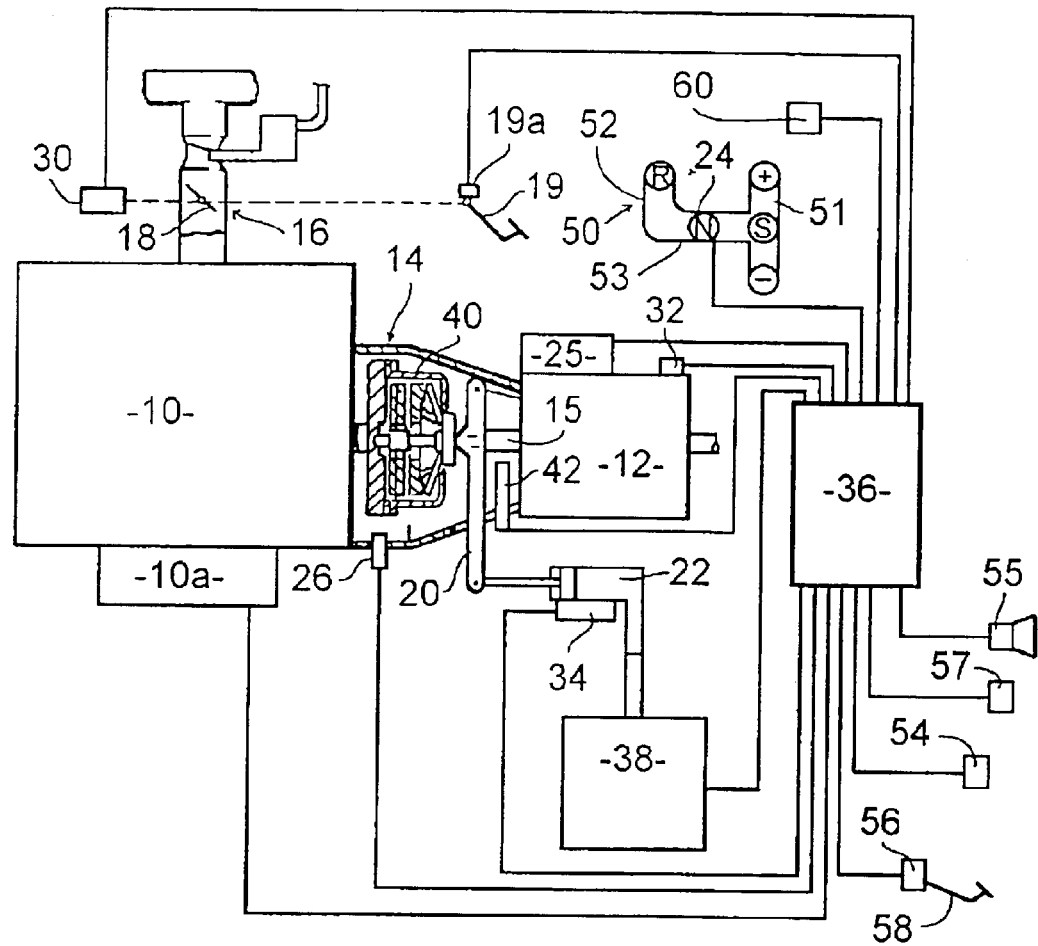
FIG. 1 shows diagrammatically a semi-automated transmission system.

FIG. 1 of the accompanying drawings shows an engine 10 with a starter and associated starter circuit 10a which is coupled through the main drive friction clutch 14 to a multi-speed synchromesh lay shaft-type gearbox 12, via a gearbox input shaft 15. Fuel is supplied to the engine by a throttle 16 which includes a throttle valve 18, operated by accelerator pedal 19. The invention is equally applicable to electronic or mechanical fuel injection petrol or diesel engine.

The clutch 14 is actuated by a release fork 20 which is operated by a hydraulic slave cylinder 22, under the control of a clutch actuator control means 38.

A gear selector lever 24 operates in a gate 50 having two limbs 51 and 52 joined by a cross track 53 extending between the end of limb 52 and intermediate of the ends of limb 51. The gate 50 defines five positions; "R" at the end of limb 52; "N" intermediate of the ends of the cross track 53; "S" at the junction of limb 51 with the cross track 53; and "+" and "−" at the extremities of limb 51. In limb 51 the lever 24 is biased to the central "S" position. The "N" position of the selector lever 24 corresponds to neutral; "R" corresponds to selection of reverse gear; "S" corresponds to selection of a forward drive mode; momentary movement of the lever to the "+" position provides a command to cause the gearbox to shift up one gear ratio; and momentary movement of the gear lever 24 to the "−" position provides a command to cause the gearbox to shift down one gear ratio.

The positions of the lever 24 are sensed by a series of sensors, for example micro switches or optical sensors, positioned around the gate 50. Signals from the sensors are fed to an electronic control unit 36. An output from the control unit 36 controls a gear engaging mechanism 25, which engages the gear ratios of the gearbox 12, in accordance with movement of the selector lever 24 by the vehicle operator.

In addition to signals from the gear selector lever 24, the control unit 36 receives signals from:

sensor 19a indicative of the degree of depression of the accelerator pedal 19;

sensor 30 indicative of the degree of opening of the throttle control valve 18;

sensor 26 indicative of the engine speed;

sensor 42 indicative of the speed of the clutch driven plate; and sensor 34 indicative of the clutch slave cylinder position.

The control unit 36 utilises the signals from these sensors to control actuation of the clutch 14 during take-up from rest and gear changes, for example as described in patent specifications EP0038113, EP0043660, EP0059035, EP0101220 and WO92/13208 whose content is expressly incorporated in the disclosure content of the present application.

In addition to the above mentioned sensors, control unit 36 also receives signals from a vehicle speed sensor 57, ignition switch 54 and brake switch 56 associated with the main braking system, for example the footbrake 58 of the vehicle.

A buzzer 55 is connected to the control unit 36 to warn/indicate to the vehicle operator as certain operating conditions occur. In addition or in place of the buzzer 55 a flashing warning light or other indicating means may be used. A gear indicator 60 is also provided to indicate the gear ratio selected.

Figure 2:
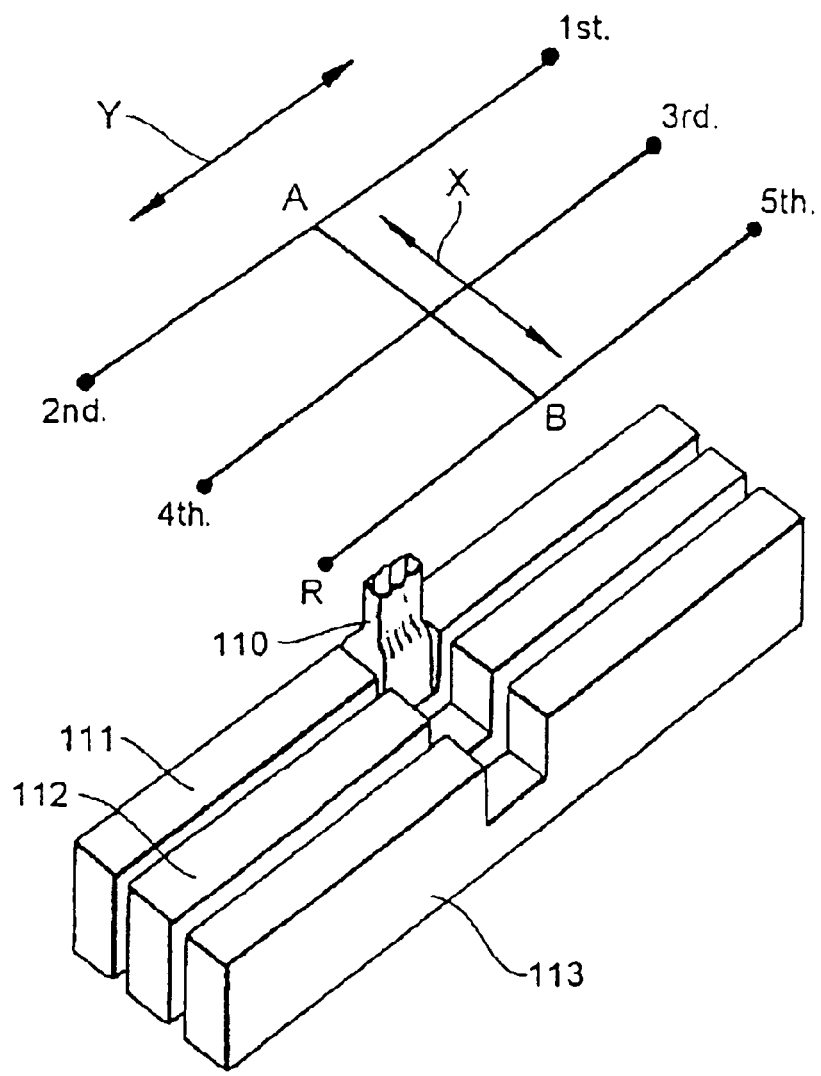
FIG. 2 shows a gear selector mechanism and associated selector gate of the transmission system illustrated in FIG. 1.

As illustrated in FIG. 2, the gear engagement mechanism 25 comprises three shift rails 111,112,113 mounted parallel to one another for movement in an axial direction. Each shift rail 111,112,113 is associated with two of the gear ratios of the gearbox 12, via a selector fork and synchromesh unit in conventional manner, so that movement of the shift rails 111,112,113 in one axial direction will cause engagement of one of the associated gear ratios and axial movement of the shift rail 111,112,113 in the opposite axial direction will cause engagement of the other associated gear ratio.

Typically; first and second gear ratios are associated with shift rail 111, so that axial movement of the shift rail 111 in a first direction will engage first gear or axial movement of shift rail 111 in a second direction will engage second gear; third and fourth gear ratios are associated with shift rail 112, so that axial movement of shift rail 112 in the first direction will engage third gear or axial movement of shift 112 in a second direction will engage fourth gear; and fifth and reverse gear ratios are associated with shift rail 113, so that axial movement of shift rail 113 in the first direction will engage fifth gear while axial movement of shift rail 113 in the second direction will engage reverse gear.

A selector member 110 is mounted for movement in a select direction X transverse to the axes of the shift rails 111,112,113 and in a shift direction Y, for movement axially of the shift rails 111,112 and 113. The selector member 110 may thus be moved in direction X along a neutral plane A-B, so that it may be indexed with and engaged a selected one of the shift rails 111,112 and 113. The selector member 110 may then be moved in direction Y to move the engaged shift rail 111,112,113 axially in either direction to engage one of the gear ratios associated therewith.

Figure 3:
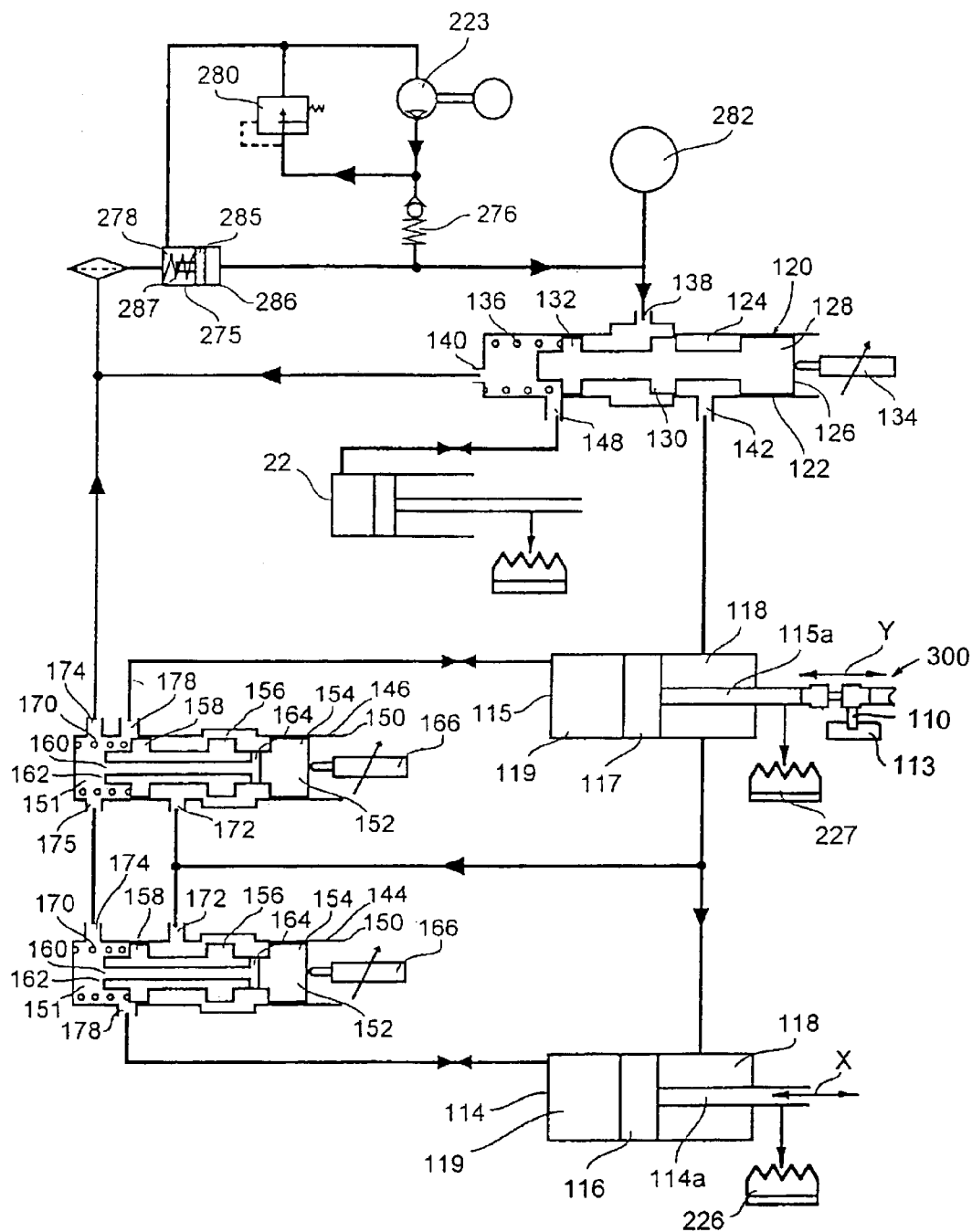
FIG. 3 illustrates diagrammatically a hydraulic actuating system for the transmission system illustrated in FIG. 1.

As illustrated in FIG. 3, selector member 110 is movable in the select direction X by means of a fluid pressure operated select actuator 114, along the neutral plane A-B of the gate illustrated in FIG. 2, to align the selector member 110 with one of the shift rails 111,112,113, and thereby select a pair of gears associated with that shift rail. The selector member 110 may then be moved in the shift direction Y by means of a fluid pressure operated shift actuator 115, to move the shift rail 111,112,113 axially in either direction to engage one of the gear ratios associated therewith.

The actuators 114 and 115 each comprise a double-acting ram having pistons 116,117 respectively, which divide the actuators 114,115 into two working chambers 118,119, the working chambers 118,119 being disposed on opposite sides of each of the pistons 116,117. Operating rods 114a, 115a extend from one side of the pistons 116,117 respectively and are operatively connected with the selector member 110 for movement thereof in the select and shift directions X and Y respectively. As a consequence of the connection of operating rods 114a, 115a to the pistons 116,117, the working area of pistons 116,117 exposed to working chamber 118 is smaller than the working area of pistons 116,117 exposed to working chamber 119.

A solenoid operated main control valve 120 comprises a housing 122, defining a bore 124. A spool 126 is slidably located in the bore 124, the spool 126 having three axially spaced circumferential lands 128,130,132 which sealingly engage the bore 124. A solenoid 134 acts on one end of the spool 126, so that upon energisation of the solenoid 134, the spool 126 is moved axially of the bore 124 against a load applied by a compression spring 136, acting on the opposite end of the spool 126.

An inlet 138 to the bore 124 of valve 120 is connected to a spring accumulator 275.

An outlet 140 from the bore 124 of the main control valve 120 is connected to a reservoir 278 defined by the housing of the accumulator 275. A first port 142 from bore 124 is connected to working chambers 118 of the select and shift actuators 114,115 and selectively to working chambers 119 via select and shift valves 144,146 and a second port 148 is connected to the clutch slave cylinder 22. A pressure relief valve 280 is provided between the outlet of the pump 223 and the reservoir 278, to ensure that the pressure supplied by the pump 223 does not exceed a maximum predetermined value.

The shift and select valves 144,146 are both solenoid operated valves having a housing 150 defining a bore 151 with a spool 152 slideably mounted in the bore 151. The spool 152 has three axially spaced circumferential lands 154,156,158, the lands sealingly engaging the bore 151. An axial bore 160 opens to end 162 of the spool 152 and connects to a cross-bore 164, the cross-bore 164 opening between lands 154 and 156 of the spool 152. A solenoid 166 acts on end 168 of spool 152 remote from the end 162, so that upon energisation of the solenoid 166, the spool 152 will move axially of the bore 151 against a load applied by a compression spring 170 acting on end 162 of the spool 152.

An inlet 172 to the bore 151 is connected to port 142 of the main control valve 120. An outlet 174 from the bore 151 is connected to the reservoir 278. Port 178 of the select valve 144 is connected to the second working chamber 119 of the select actuator 114 and port 178 of shift valve 146 is connected to the second working chamber 119 of shift actuator 115.

When the transmission is in gear and the clutch 14 engaged, the solenoids 134 and 166 will be de-energised and valves 120,144 and 146 will be in the rest positions illustrated in FIG. 3. In this position, the clutch slave cylinder 22 is connected via port 148 and outlet 140 of the main control valve 120 to the reservoir 278; the working chambers 118 of the select and shift actuators 114,115 will be connected to the reservoir 278 via inlet 172, passageways 164,160 and outlet 174 of the select and shift valves 144,146; and working chambers 119 of the select and shift actuators 114,115 will be connected to the reservoir 278 via port 178 and outlet 174 of the select and shift valves 144,146. There will consequently be no movement of the clutch slave cylinder 22 or select and shift actuators 114,115.

When a gear change is initiated by, for example, the driver of the vehicle moving the gear selector lever 24 momentarily to the '+' position, or by automatic initiation, solenoid 134 is energised to move the spool 126 of main control valve 120 to a second position. In this second position the working chambers 118 of both the select and shift actuators 114,115, and inlets 172 of the select and shift valves 144,146 are connected to the spring accumulator 275, via port 142 and inlet 138. In this second position the clutch slave cylinder 22 remains connected to the reservoir 278.

Simultaneously, with energisation of solenoid 134 to move the main control valve 120 to the second position, solenoids 166 of the select and shift control valves 144,146 are energised to move the spool 152 to a null position. In this null position, the land 158 of spool 152 closes port 178 thereby closing working chamber 119 and creating a hydraulic lock preventing movement of the select and shift actuators 114 and 115, even though working chambers 118 thereof are connected to the spring accumulator 275 by the main control valve 120. The connection of port 172 to the outlet 174 via bores 160 and 164 is also closed.

Further energisation of the solenoid 134 to a third position will then close the connection between the clutch slave cylinder and the reservoir and open the connection between the clutch slave cylinder and the spring accumulator 275, actuating the release fork 20 to disengage the clutch 14.

Upon disengagement of the clutch 14, solenoid 134 of the main control valve 120 may be energised to move the main control valve back to a fourth position. In this fourth position, the port 148 is isolated from the inlet 138 and the outlet 140, so that the clutch 14 will be clamped in the disengaged position. The solenoids 166 of the select and shift valves 144,146 may then be selectively energised, moving the select and shift valves 144,146 between third and fourth positions, in order to disengage the currently selected gear and engage a new gear.

Energisation of solenoid 166 to move the select or shift valve 144,146 to a third position, in which working chamber 119 is connected to reservoir 278, while working chamber 118 is connected to the accumulator 275, will create a pressure differential across the pistons 116 and 117, causing the operating rod 114a, 115a to extend. Energisation of solenoid 166 to move the select or shift valve 144,146 to a fourth position, in which both working chambers 118 and 119 are connected to the accumulator 275, will cause the operating rods 114a, 115a to retract, due to the differential working areas of the pistons 116 and 117. Consequently, by appropriate control solenoids 166 of the select and shift valves 144, 146, the selector member 110 may be moved to engage the desired gear.

Potentiometers 226 and 227 are connected to the operating rods 114a, 115a respectively, to provide signals indicative of the position of the associated operating rods 114a, 115a. Signals from the potentiometers 226,227 are fed to the control unit 36 to provide an indication of the position of the operating rods 114a, 115a, for each of the gear ratios of the gear box 12 and also to indicate the position of the operating rod 115a, when the selector member 110 is in the neutral plane A-B of FIG. 2. The transmission system may thus be calibrated, so that predetermined position signals from the potentiometers 226 and 227 correspond to engagement of each of the gear ratios of the gearbox 12.

Measurements from the potentiometers 226 and 227 may then be used by a closed loop control system to control valves 144 and 146, to move the operating rods 114a and 115a, to the predetermined positions to engage the desired gear ratio.

When the desired gear ratio has been engaged, the solenoids 166 of the select and shift valves 144,146 are energised to move the valves 144,146 back to their null positions, closing the ports 178 and creating a hydraulic lock preventing movement of the actuators 114,115.

Solenoid 134 of the main control valve 120 may then be energised to move the main control valve 120 from its fourth to its second position, thereby allowing fluid from the clutch slave cylinder 22 to be returned to the reservoir 278, permitting re-engagement of the clutch 14. The main control valve 120 may be switched between the third and second positions, so that the clutch 14 is re-engaged in controlled manner, for example as disclosed in EP0038113; EP0043660; EP0059035; EP0101220 or WO92/13208.

When the clutch 14 has been re-engaged, solenoid 134 of the master control valve 120 may be de-energised, so that it returns to the rest position illustrated in FIG. 3. Similarly the solenoids 166 of the shift and select valves 144,146 may be de-energised. Movement of the select and shift valves 144, 146 to the rest position illustrated in FIG. 3 will open working chamber 119 to reservoir 278, thereby releasing pressure therein.

As illustrated in FIG. 3, the shift actuator 115 is connected to the selector member 110 via a compliant link 300. As illustrated in greater detail in FIG. 4, the compliant link 300 has first and second members 302 and 304 mounted coaxially of one another, member 302 being connected to the shift actuator rod 115a and the member 304 being connected to the selector member 110.

The adjacent ends 306 of members 302 and 304 are provided with bores 308, an annular flange formation 310 extending radially inwardly of the bores 308 at the ends 306. A connecting rod 312 is provided with head formations 314 and 316, one at each end. The head formations 314 and 316 slidingly engaging in the bores 308 of members 302 and 304, respectively. A first helical compression spring 320 is located within bore 308 of member 302 and acts between an inner end 322 or the bore 320 and the head formation 314 of the connecting rod 312. Spring 320 thereby urges the head formation 314 into abutment with the flange formation 310 of member 302. A second helical compression spring 330 acts between the flange formation 310 of the second member 304 and the head formation 316 of the connecting rod 312. Spring 330 thereby urges the head formation 316 into abutment with an inner end 332 of the bore 308 of member 304. The springs 320 and 330 are compressed to apply a preload of a predetermined value to the head formations 314 and 316 of the connecting rod 312.

Figure 4:
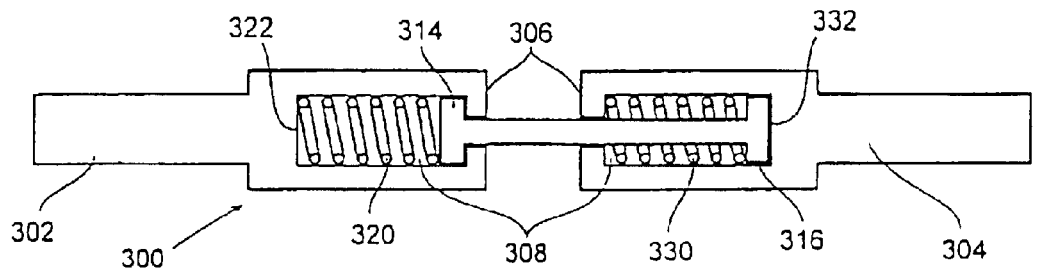
FIG. 4 is a detailed diagrammatic illustration of the compliant link used in the system illustrated in FIG. 3.
Figure 5:
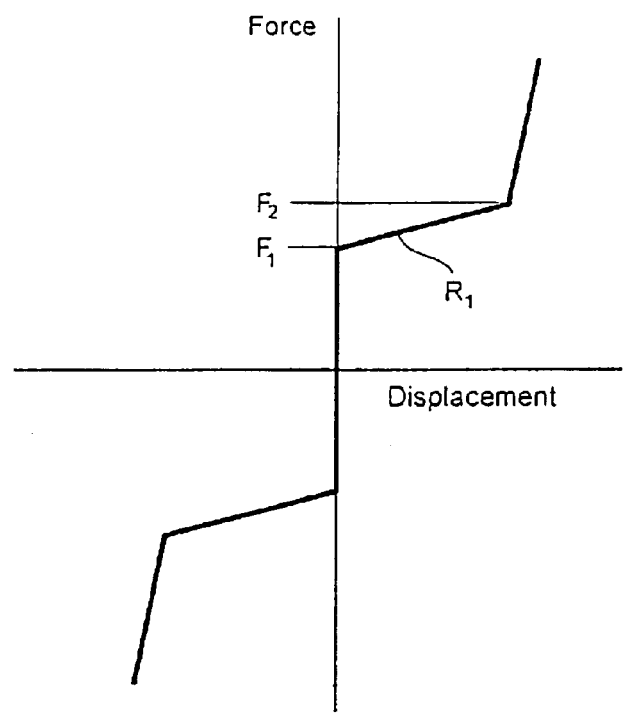
FIG. 5 is a plot showing force versus displacement for the link illustrated in FIG. 4.

When a load is applied to the compliant link 300 by the shift actuator 115, moving the link 300 to the right as illustrated in FIG. 4, as long as the reaction force of the selector member 110 remains below the predetermined value to which spring 320 is preloaded, the compliant link 300 will act as a solid link. However, when the reaction force at the selector member 110 rises above the predetermined value $F_1$ as illustrated in FIG. 5, for example when the synchroniser is engaged, spring 320 is compressed and the load applied to the synchroniser increases at a rate $R_1$ depending upon the spring rate of spring 320. Upon compression of spring 320, members 302 and 304 move towards one another until when the force is $F_2$ and the spring 320 become fully compressed and the link will again act as a solid link. The initial load applied to the synchroniser is thereby restricted to the predetermined value, the load increasing thereafter at a controlled rate.

Similarly, if the load applied by the shift actuator 115 moves the link 300 to the left as illustrated in FIG. 4, the link will remain rigid until the reaction force reaches the predetermined preload value. Spring 330 will then be compressed limiting the rate of increase in the force applied to the synchroniser depending upon the spring rate of the spring 330.

Positioning of the compliant link 300 between the shift actuator 115 and selector member 110 will thereby restrict the forces applied to the synchromesh mechanism, avoiding damage thereto and the generation of noises and jerks in the drive line.

Various modifications may be made without departing from the invention. For example, while in the above embodiment, a semi-automated transmission has been described, the invention is equally applicable to fully automated transmission systems or automated manual transmission systems. Furthermore, the compliant link of the present invention may be used in other applications.

While a double-acting compliant link has been described above, it will be appreciated that a single-acting link may alternatively be provided where the actuator operates in only one direction. Moreover, while the compliant link described above is located between a shift actuator and a selector member, the compliant link may alternatively connect the shift actuator directly to the shift rail.

While the compliant link of the present invention is particularly suitable for use in hydraulic actuating systems, the link may also be used in pneumatic actuating systems or in systems utilising electrical actuation means, for example electric motors or solenoids, as described in DE19504847; WO97/10456 or DE19734023, whose contents are expressly incorporated in the disclosure content of the present invention.

The patent claims submitted with the application are proposed formulations without prejudice to the achievement of further patent protection. The applicant reserves the right to submit claims for further combinations of characteristics, previously only disclosed in the description and/or drawings.

References back used in sub-claims refer to the further development of the subject of the main claim by the characteristics of the respective sub-claim; they are not to be understood as a waiver with regard to achieving independent item protection for the combination of characteristics in the related sub-claims.

Since the subject of the sub-claims can form separate and independent inventions with reference to the prior art on the priority date, the applicant reserves the right to make them the subject of independent claims or of division declarations. Furthermore, they may also contain independent inventions which demonstrate a design which is independent of one of the objects of the preceding sub-claims.

The embodiments are not to be considered a restriction of the invention. Rather, a wide range of amendments and modifications is possible within the scope of the current disclosure, especially those variations, elements and combinations and/or materials which, for example, the expert can learn by combining individual ones together with those in the general description and embodiments in addition to characteristics and/or elements or process stages described in the claims and contained in the drawings with the aim of solving a task thus leading to a new object or new process stages or sequences of process stages via combinable characteristics, even where they concern manufacturing, testing and work processes.

What is claimed is:

1. A compliant link comprising first and second members, said members being interconnected by resilient means, the resilient means being preloaded to prevent relative movement between the members when an axial load below a first predetermined value is applied to one of the members, wherein both the first and second members are prestressed in both directions of operation of the compliant link, wherein the first and second members are interconnected by means of a connecting rod, the connecting rod being moveable relative to both the first and second members, first resilient means acting between the first member and the connecting rod to oppose contraction of the link and second resilient means acting between the second member and the connecting rod to oppose extension to the link, and wherein the first resilient means acts between the first member and the connecting rod biasing the connecting rod towards the second member and into abutment with a stop formation on the first member and the second resilient means acts between the second member and the connecting rod biasing the connecting rod away from the first member and into engagement with a stop formation on the second member.

2. A compliant link according to claim 1 in which the resilient means provides compliance for loads applied to the link in opposite directions.

3. A compliant link according to claim 1 in which relative movement between the members is limited so that the compliant link acts as a solid link when an axial load above a second predetermined value is applied to one of the members.

4. A compliant link according to claim 1, wherein the first and second members are interconnected by means of a connecting rod, the connecting rod being moveable relative to both the first and second members, first resilient means acting between the first member and the connecting rod to oppose contraction of the link and second resilient means acting between the second member and the connecting rod to oppose extension to the link.

5. A gear engagement mechanism comprising a shift actuator coupled to a shift rail, a compliant link as claimed in claim 1 being included between the shift actuator and shift rail.

6. A gear engagement mechanism according to claim 5 in which the shift actuator is connected to the shift rail by the compliant link.

7. A gear engagement mechanism according to claim 5 in which the shift actuator is connected to a selector member by the compliant link, the selector member being arranged to selectively engage the shift rail which is member of a plurality of shift rails.

* * * * *